(12) United States Patent
Hood (10) Patent No.: US 7,775,355 B1
(45) Date of Patent: Aug. 17, 2010

(54) DECORATIVE PORTABLE COMPUTER COVER

(76) Inventor: Richard W. Hood, 4195 Via San Jose, Riverside, CA (US) 92504

( * ) Notice: Subject to any disclaimer, the term of this patent is extended or adjusted under 35 U.S.C. 154(b) by 91 days.

(21) Appl. No.: 12/291,721

(22) Filed: Nov. 13, 2008

(51) Int. Cl.
*B65D 85/00* (2006.01)
(52) U.S. Cl. .................................. 206/320; 206/459.5
(58) Field of Classification Search ................ 206/305, 206/320, 457, 459.1, 459.5, 576; 150/154, 150/165; 361/679.01, 679.02, 679.09, 679.26, 361/679.27, 688
See application file for complete search history.

(56) References Cited

U.S. PATENT DOCUMENTS

| | | | |
|---|---|---|---|
| 4,292,481 A | | 9/1981 | Barnes et al. |
| 5,136,726 A | * | 8/1992 | Kellin et al. |
| 5,848,152 A | | 12/1998 | Slipy et al. |
| 5,931,297 A | * | 8/1999 | Weill et al. ................... 206/320 |
| 5,982,881 A | | 11/1999 | Mischenko |
| 6,149,001 A | * | 11/2000 | Akins ........................... 206/320 |
| D462,518 S | | 9/2002 | Truffier-Blanc et al. |
| 6,747,578 B1 | | 6/2004 | Lam et al. |
| 6,769,588 B2 | * | 8/2004 | Zheng ......................... 224/576 |
| 7,031,148 B1 | * | 4/2006 | Lin ............................. 206/320 |
| 7,194,291 B2 | | 3/2007 | Peng |
| 7,197,345 B2 | | 3/2007 | Kim et al. |
| 7,203,467 B2 | | 4/2007 | Siddiqui |
| 7,206,618 B2 | * | 4/2007 | Latto et al. ................ 455/575.8 |
| 7,389,872 B2 | * | 6/2008 | Wheeler et al. ............. 206/320 |
| 2006/0226040 A1 | * | 10/2006 | Medina ....................... 206/320 |
| 2007/0119734 A1 | * | 5/2007 | Pichahchi .................... 206/320 |

\* cited by examiner

*Primary Examiner*—Luan K Bui
(74) *Attorney, Agent, or Firm*—Montgomery Patent and Design; Robert C. Montgomery; Joseph T. Yaksich (57) ABSTRACT

A system and method by which interchangeable covers are provided for a portable computer comprising two (2) covers which are generally flat in shape is herein disclosed. A first cover would attach onto a top surface of the portable computer thus protecting an outward facing component of a display screen, while a second cover would attach onto a bottom portion of the portable computer. Both covers would extend around side surfaces thus protecting the sides of the computer as well. The covers would provide manually removable sections allowing access thereto computer features such as buttons, cooling vents, connection ports, and the like. It is envisioned that the covers would be made in multiple colors and styles with graphic printing to suit individual tastes. Such graphics are envisioned to be flames, sport heroes, music or movie icons, company logos, or the like. Additionally, plain covers could be adorned with stickers, paints, or other user applied items without fear of damaging the laptop, voiding warranties, or reducing resale value. To change the appearance of a portable computer, the user would simply attach new covers.

11 Claims, 6 Drawing Sheets

DECORATIVE PORTABLE COMPUTER COVER

RELATED APPLICATIONS

The present invention was first described in a notarized Official Record of Invention filed on Apr. 18, 2007. There are no previously filed or pending applications filed anywhere in the world.

FIELD OF THE INVENTION

The present invention relates generally to a decorative and protective cover for an electronic device and more specifically to a decorative cover for portable computers possessing removable sections thereby permitting access through said cover for peripherals, ports and the like.

BACKGROUND OF THE INVENTION

Many people customize their electronic devices with stylistic logos, colors and distinctive graphic design in order to personalize said devices. The market for such customizable decorative covers is competitive.

A large percentage of American households own at least one personal computer. As these numbers continue to increase, the market for computer accessories is growing as well. A significant part of this market is devoted to decorative and novelty accessories that allow the computer owner to personalize their systems. However, the presence of items to customize portable computers is strangely lacking. Accordingly, there is a need for a means by which portable notebook computers can be customized to suit the user's personal tastes and preferences. The development of the decorative and protective cover for a portable computer herein described fulfills this need.

Several attempts have been made in the past to provide covers for electronic devices. U.S. Pat. No. D 462,518 issued to Truffier-Blanc et al. discloses a cover for portable computer that takes the form of a case that covers the portable computer and possesses a latching mechanism. Unfortunately, this design patent does not appear to disclose a two-piece cover that snaps over the display screen and keyboard portion, nor does it appear to possess removable sections nor does it appear to be similar in appearance to the disclosed invention.

U.S. Pat. No. 7,206,618 issued to Latto discloses a transparent faceplate that accepts removable customizable inserts for electronic devices. Unfortunately, this patent fails to disclose a two-piece protective decorative cover for a portable computer that comprises a plurality of removable sections that permit access to peripheral connections and the like.

U.S. Pat. No. 7,203,467 issued to Siddiqui discloses a protective case for the electronics contained within a mobile electronic device. Unfortunately, this patent fails to disclose a two-piece protective cover for a portable computer that slides over top of a portable case and comprises a plurality of sections that can be removed to provide access to peripheral ports.

U.S. Pat. No. 7,197,345 issued to Kim et al. discloses a replaceable sliding cover unit comprising a main body; a folder and a hinge for rotatably connecting the folder to the main phone body. Unfortunately, this patent does not appear to disclose a protective cover for a portable computer comprising a keyboard cover portion and a display screen portion with a plurality of removable sections.

U.S. Pat. No. 7,194,291 issued to Peng discloses a protective cover mask for mobile phone comprising an upper cover body and a lower cover body. Unfortunately, this patent does not appear to disclose a protective cover for a portable computer that comprises a keyboard cover and a display cover that envelopes that display screen and is transparent to permit viewing of the display screen. Further this patent does not appear to teach a protective cover with a plurality of removable sections for accessing ports contained thereon the portable computer.

U.S. Pat. No. 6,747,578 issued to Lam et al. discloses an integrated removable functional faceplate for a portable computer system comprising a faceplate that possesses the necessary buttons for operation of the computer. Unfortunately, this patent does not appear to disclose a decorative two-piece protective cover for a portable computer.

U.S. Pat. No. 5,982,881 issued to Mischenko discloses a mobile telephone handset having a faceplate to accommodate a plurality of distinctive telephone appearances. Unfortunately, this patent does not appear to disclose a decorative protective cover for a portable computer comprising a display cover portion and a keyboard portion that further comprises a plurality of removable sections to permit access to peripheral ports on the portable computer.

U.S. Pat. No. 5,848,152 issued to Slipy et al. discloses a telephone with interchangeable faceplates and an active keypad cover. Unfortunately, this patent does not appear to disclose a decorative protective cover for a portable computer comprising a display screen portion with a transparent section and a keyboard portion that can be slidably placed over a portable computer for protection.

U.S. Pat. No. 4,292,481 issued to Barnes et al. discloses a decorative appliqé and decorative faceplate assembly for traditional desk mounted push-button telephones. Unfortunately, this patent does not appear to disclose a decorative protective cover for a portable computer that comprises a plurality of removable sections to permit access to drives and peripherals on the portable computer.

SUMMARY OF THE INVENTION

In view of the foregoing disadvantages inherent in the prior art, it has been observed that there is a need for a two-piece flexible resilient covering for portable computers that comprises decorative elements and removable sections for interface elements and fans.

It is an object of the present invention to describe a device and method for a decorative portable computer cover, which provides interchangeable hard plastic covers for a portable computer, comprising two (2) large plastic portions which are generally flat and rectangular in shape.

Another object of the decorative portable computer cover display screen cover fastens onto a top outer surface of the portable computer thus protecting a rear or outward facing component of a display screen. A keyboard cover portion would fasten onto a bottom section of the portable computer in like manner.

A further object of the decorative portable computer cover provides that said display screen cover and keyboard cover extend around upper and lower computer sides to protect the side surfaces of the portable computer. The covers would be molded in decorative elements such as multiple colors and graphic styles to suit individual tastes. To change the appearance of a portable computer, a user would fasten new covers thereon without using any tools.

Yet another object of the decorative portable computer cover provides a plurality of various shaped removable sections specifically designed to accommodate all access panels, buttons, cooling vents, connection ports, and the like on a variety of models of portable and laptop computers.

Yet a further object of the decorative portable computer cover is a device that would be universal and introduced by size and fit to be applied to any number of models molded to fit various brands and models of portable computers offered by popular manufacturers as well as various types of computers such as, but not limited to: notebook computers, laptop computers, and the like.

Still a further object of the decorative portable computer cover is a display screen cover provided in transparent or single color models that may be adorned by a user with stickers, paints, or other user applied items without fear of damaging the computer, voiding warranties, or reducing resale value.

An aspect of the decorative portable computer cover comprises a display screen cover, a keyboard cover portion, a plurality of removable sections, and a plurality of decorative elements. Said covers provide a decorative and protective means to an existing portable computer comprising a two-piece flexible hard plastic enclosure in a similar manner as common cellular phone faceplates common in the industry.

Another aspect of the decorative portable computer cover comprises a display screen cover with a first panel, a first edge, and a plurality of decorative elements. The first panel provides a thin flat hard plastic layer approximately one-sixteenth ($1/16$) of an inch thick applied thereto an outward facing component of a display screen portion of the portable computer. The first panel is envisioned to provide a variety of decorative elements such as, but not limited to: multiple colors, graphic styles, surface textures, graphic printing, flames, sports logos/heroes, music icons, movie icons, company logos, and the like.

Yet another aspect of the decorative portable computer cover comprises a first panel that expands outwardly to form an integrally molded wrap-around edge portion located thereupon the outer three edges of the display screen forming a channel-shaped appendage capable of being flexibly expanded and snapped therearound an edge portion of the portable computer providing a firm encasement. The display screen cover does not inhibit the motion of the portable computer hinge as no wrap around channel is present on the hinge edge region.

Still another aspect of the decorative portable computer comprises a display screen cover made of a rugged scratch-resistant plastic being produced in an injection molding process common in the industry.

A further aspect of the decorative portable computer comprises a keyboard cover portion that provides a protective enclosure thereto a lower keyboard portion of the portable computer along the bottom and side surfaces thereof comprising a second panel and a second edge region. The second panel and second edge regions are envisioned to comprise similar functionality, materials, and construction as the respective first panel and first edge portions of the display screen cover. The keyboard cover further comprises a third panel located along an upper surface forming a molded pocket-shaped protective covering thereto a hand rest surface commonly provided on particular portable computer models. The third panel is envisioned to provide matching or contrasting decorative elements as the display screen cover described above.

Still a further aspect of the decorative portable computer comprises a plurality of removable sections along bottom and side surfaces of said keyboard cover providing functional customization thereto said keyboard cover. Said plurality of removable sections is positioned along the second edge, second panel and third panel. The removable sections comprise perforated rectangular or round shapes using a stamped or laser cutting process. Said removable sections are envisioned to be manually removed, thereby allowing access thereto interface features of the portable computer such as, but not limited to: power cables, access panels, buttons, cooling vents, connection ports, disc drives, and the like.

Still a further aspect of the decorative portable computer cover comprises a keyboard cover portion as described above, with a second panel possessing a plurality of removable sections. The section panel covers the bottom surface of the portable computer and provides the user with the ability to remove removable sections as necessary so as to accommodate the working of the cooling fan or provide access to other portable computer peripherals or ports located on the underside of the computer.

A method of installing and utilizing the device may be achieved by performing the following steps: procuring a particular model of the device which corresponds thereto a specific portable computer; installing the display screen cover to the display screen portion of the portable computer by gently flexing said display screen cover and forcing the first edge region over outer peripheral features of the display screen portion of the computer until obtaining a secure and complete fit around said computer screen; removing a plurality of removable sections located thereon the keyboard cover portion to provide an access opening thereto existing interface features such as access panels, buttons, cooling vents, connection ports, disc drives, and the like; installing the keyboard cover portion in like manner as the display screen cover described above; checking for proper alignment of said access opening therein the keyboard cover with respect to the interface features; using the portable computer in an expected manner as needed; replacing or exchanging said cover with a new cover providing a variety of different decorative elements such as colors, graphic styles, surface textures, logos, and the like, based upon a user's preference; decorating external surfaces of the computer cover as desired using stickers, paints, or other user applied artistic and personalized items; and, enjoying a decorative appearance and personal expression of the portable computer cover.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| 10 | decorative portable computer cover |
|----|------------------------------------|
| 20 | display screen cover |
| 22 | first panel |
| 25 | first edge region |
| 30 | keyboard cover |
| 32 | second panel |
| 33 | third panel |
| 35 | second edge region |
| 40 | removable section |
| 50 | decorative element |
| 80 | portable computer |

DETAILED DESCRIPTION OF THE PREFERRED EMBODIMENT

Figure 1:
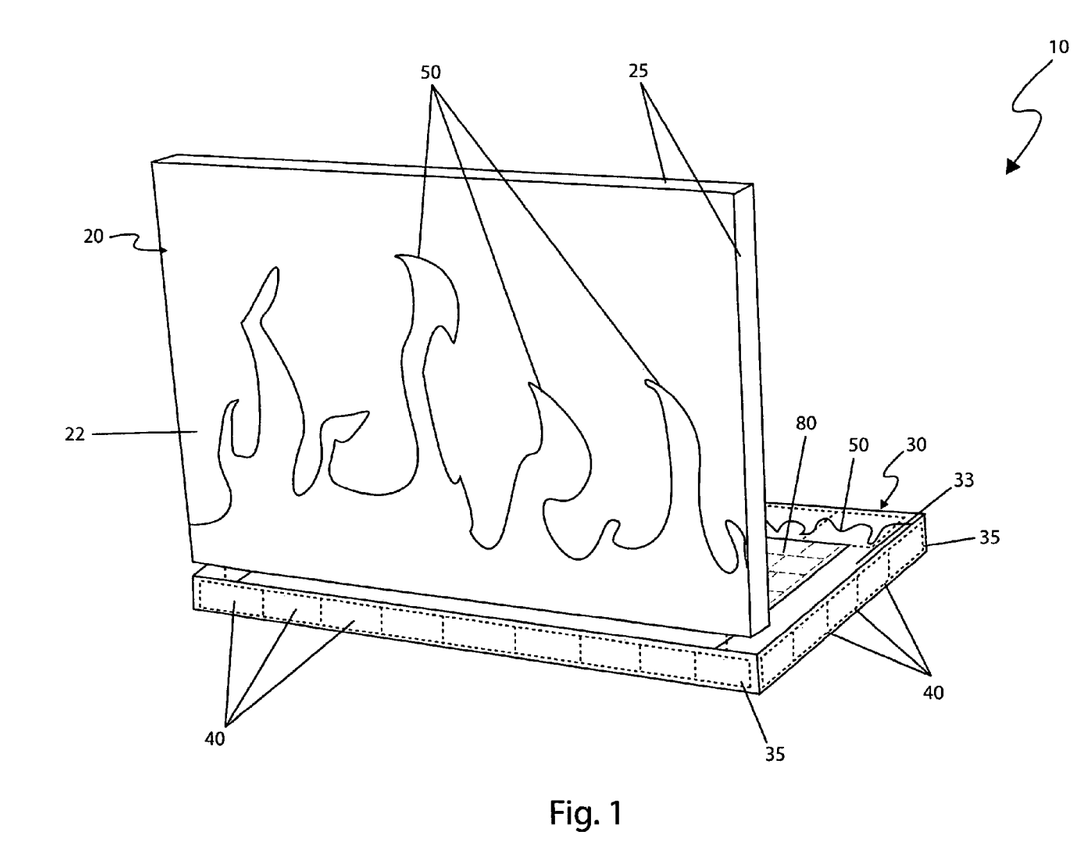
FIG. 1 is a side perspective view of a portable computer cover 10, according to a preferred embodiment of the present invention.
Figure 6:
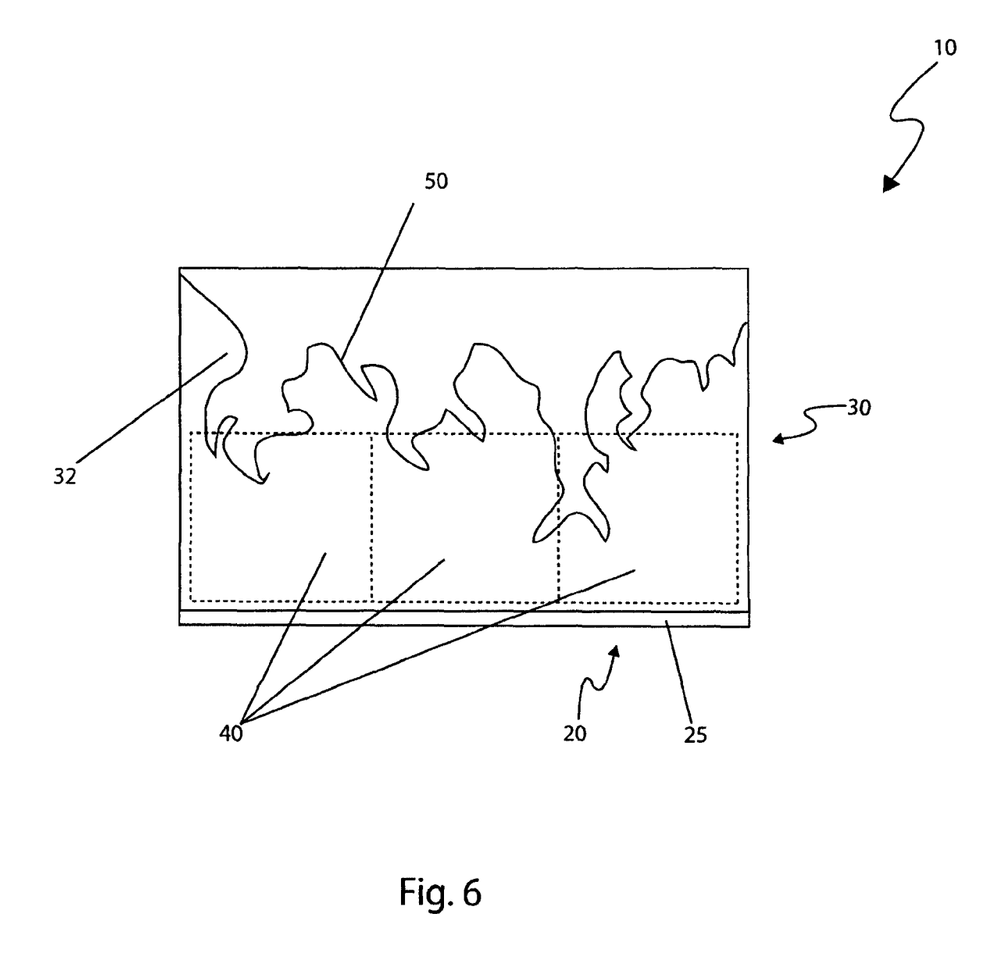

The best mode for carrying out the invention is presented in terms of its preferred embodiment, herein depicted within FIGS. 1 and 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a decorative portable computer cover (herein described as the "device") 10, which provides interchangeable hard plastic covers for a portable computer 80 comprising two (2) large plastic portions which are generally flat and rectangular in shape. A display screen cover 20 fastens onto a top outer surface of the portable computer 80 thus protecting a rear or outward facing component of a display screen. A keyboard cover portion 30 would fasten onto a bottom section of the portable computer 80 in like manner. Both covers 20, 30 would extend snuggly therearound upper and lower computer sides 80 thus protecting side surfaces as well. It is envisioned that the covers 20, 30 would be molded in decorative elements 50 such as multiple colors and graphic styles to suit individual tastes. To change the appearance of a portable computer 80, a user would simply fasten new covers 20, 30 thereon without using any tools. The covers 20, 30 also provide various shaped removable sections 40 specifically designed to accommodate all access panels, buttons, cooling vents, connection ports, and the like.

Referring now to FIG. 1, a side perspective view of the device 10, according to the preferred embodiment of the present invention, is disclosed. The device 10 comprises a display screen cover 20, a keyboard cover portion 30, a plurality of removable sections 40, and a plurality of decorative elements 50. The covers 20, 30 provide both a decorative and protective means thereto an existing portable computer 80 comprising a two-piece flexible resilient plastic enclosure in a similar manner as common cellular phone faceplates common in the industry.

The display screen cover 20 comprises a first panel 22, a first edge 25, and a plurality of decorative elements 50. The first panel 22 provides a thin flat hard plastic layer approximately one-sixteenth ($1/16$) of an inch thick applied thereto an outward facing component of a display screen portion of the portable computer 80. The first panel 22 is envisioned to provide a variety of decorative elements 50 such as, but not limited to: multiple colors, graphic styles, surface textures, graphic printing, flames, sports logos/heroes, music icons, movie icons, company logos, and the like. Additionally, the display screen cover 20 may be provided in transparent or single color models envisioned being adorned thereby a user with stickers, paints, or other user applied items without fear of damaging the computer 80, voiding warranties, or reducing resale value. The first panel 22 expands outwardly to form an integrally molded wrap-around first edge region 25 located thereupon the outer three (3) edges of the display screen region forming a channel-shaped appendage capable of being flexibly expanded and snapped therearound an edge portion of the portable computer 80 providing a firm encasement thereof. The portion of the first edge region 25 of the portable computer 80 that abuts the hinge does not contain a wrap-around edge so as to permit the functioning of the hinge. The display screen cover 20 is envisioned to be made using a rugged scratch-resistant plastic such as, but not limited to: polypropylene, acrylonitrile butadiene styrene (ABS), polycarbonate, or the like, being produced in an injection molding process common in the industry.

The keyboard cover portion 30 provides a protective enclosure thereto a lower keyboard portion of the portable computer 80 along bottom and side surfaces thereof comprising a second panel 32 and a second edge region 35, respectively. The second panel 32 and second edge regions 35 are envisioned to comprise similar functionality, materials, and construction as the respective first panel 22 and first edge 25 portions of the aforementioned display screen cover 20. The keyboard cover 30 is envisioned to provide a variety of decorative elements 50 such as, but not limited to: multiple colors, graphic styles, surface textures, graphic printing, flames, sports logos/heroes, music icons, movie icons, company logos, and the like. Additionally, the keyboard cover 30 may be provided in transparent or single color models envisioned being adorned thereby a user with stickers, paints, or other user applied items without fear of damaging the computer 80, voiding warranties, or reducing resale value.

The keyboard cover 30 further comprises a third panel 33 located along an upper surface forming a molded pocket-shaped protective covering thereto a hand rest surface commonly provided on particular portable computer models 80. The third panel 33 is envisioned to provide matching or contrasting decorative elements 50 as the display screen cover 20 described above. The keyboard cover portion 30 further comprises a plurality of removable sections 40 along the second panel 32, second edge 35, and third panel 33 of said keyboard cover 30 providing functional customization thereto said keyboard cover 30. The removable sections 40 comprise perforated rectangular or round shapes using a stamped or laser cutting process. Said removable sections 40 are envisioned to be manually removed, thereby allowing access thereto interface features of the portable computer 80 such as, but not limited to: power cables, access panels, buttons, cooling vents, connection ports, disc drives, and the like.

The covers 20, 30 are illustrated here being applied thereto a typical portable computer 80; however, it is understood that said display covers 20, 30 are to be introduced in any number of models molded to fit various brands and models of portable computers 80 offered by popular manufacturers as well as various types of computers 80 such as, but not limited to: notebook computers, laptop computers, and the like.

Figure 2:
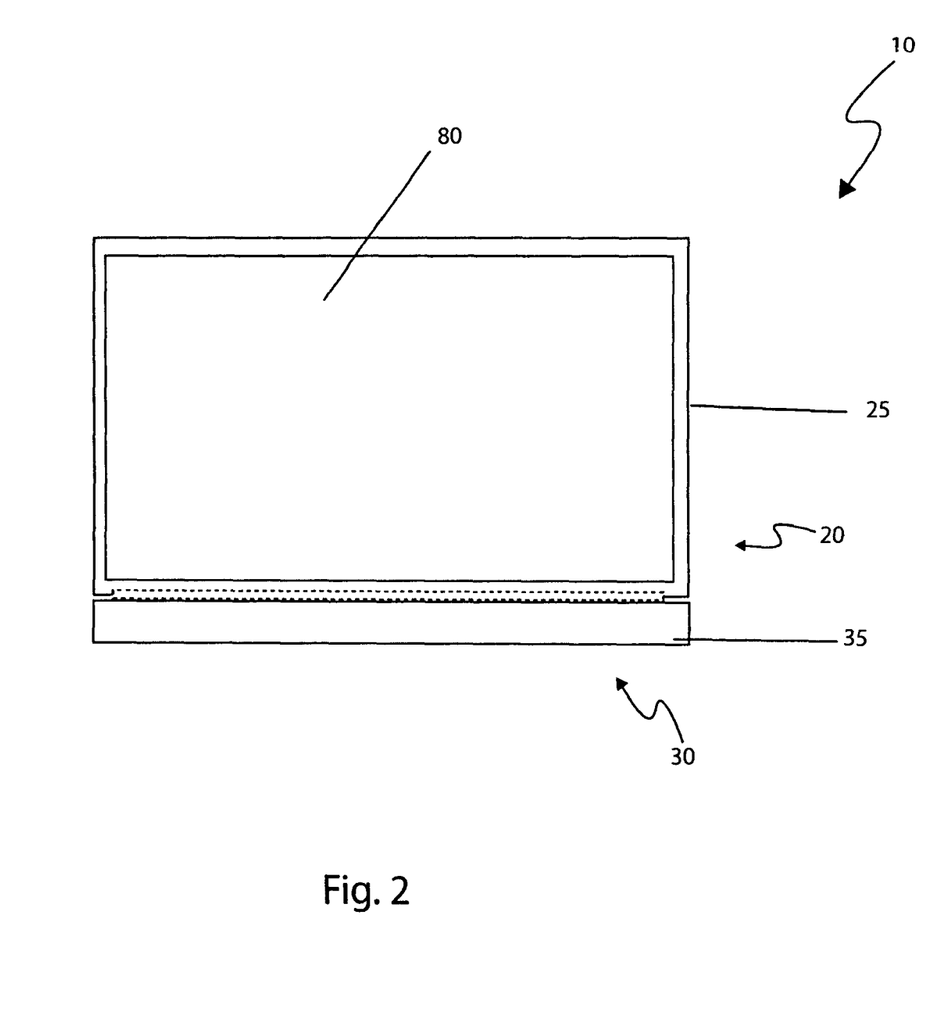
FIG. 2 is a front side view of a portable computer cover 10, according to a preferred embodiment of the present invention.

Referring now to FIG. 2, a front view of the device 10, according to the preferred embodiment of the invention is disclosed. This view illustrates the location of the display screen cover 20 and the keyboard cover 30.

Figure 3:
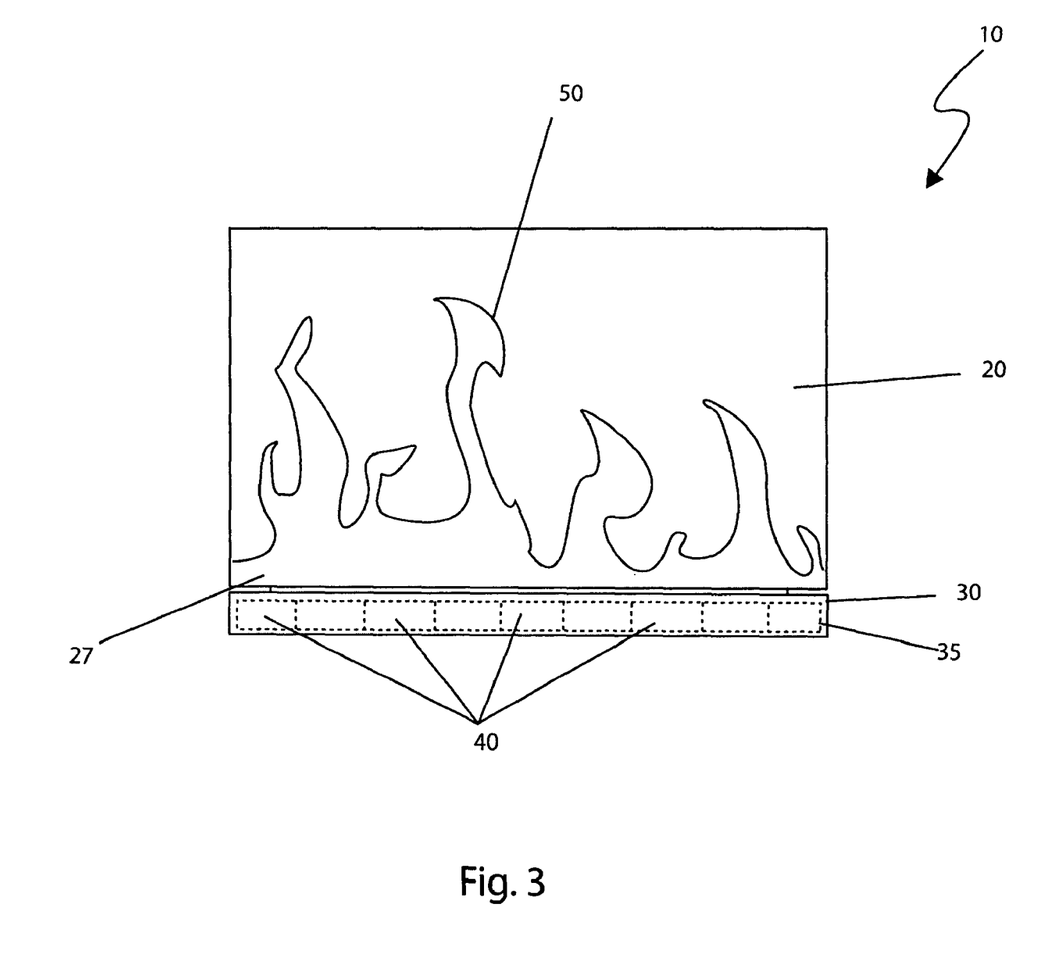
FIG. 3 is a rear side view of a portable computer cover 10, according to a preferred embodiment of the present invention.

Referring now to FIG. 3, a rear view of the device 10, according to the preferred embodiment of the invention is disclosed. This view illustrates a plurality of removable sections 40 located on the second edge 35 of the keyboard cover 30. This view also illustrates the display cover 30 and the portion of the first edge region 25 where the display cover 20 terminates before a hinge in the portable computer 80.

Figure 4:
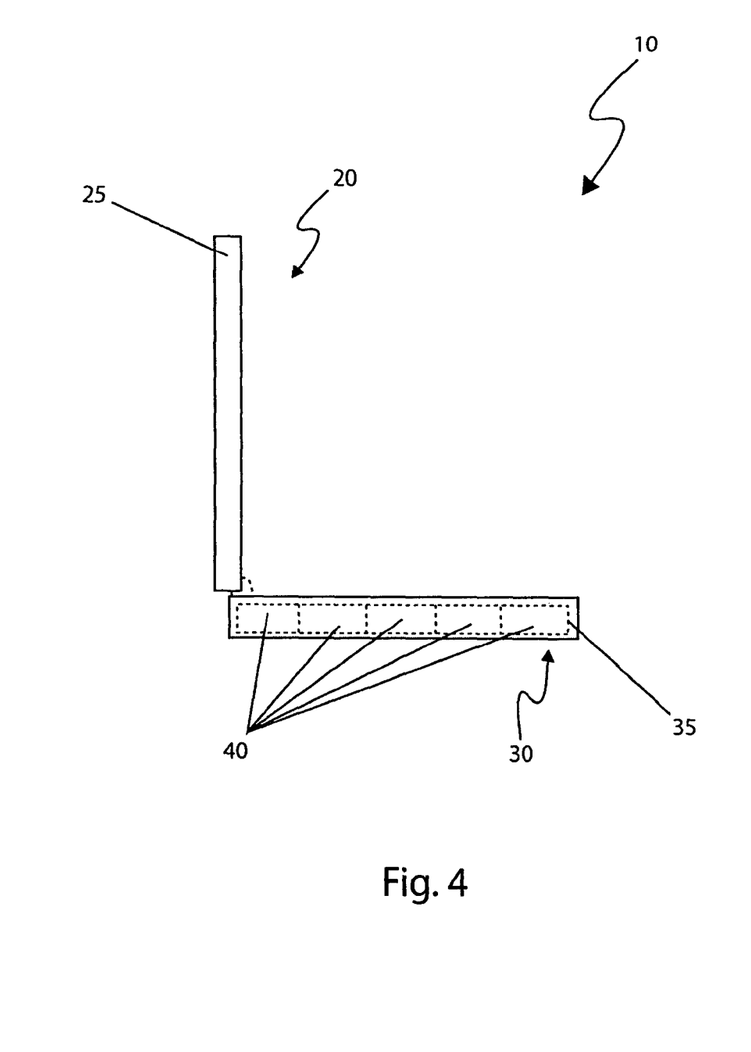
FIG. 4 is a side view of a portable computer cover 10, according to a preferred embodiment of the present invention.

Referring now to FIG. 4, a side view of the device 10, according to the preferred embodiment of the invention is disclosed. This view illustrates a plurality of removable sections 40 that are located on the side second edge region 35 of the keyboard cover 30. The relationship of the display screen cover 20 to the keyboard cover 30 is also illustrated here.

Figure 5:
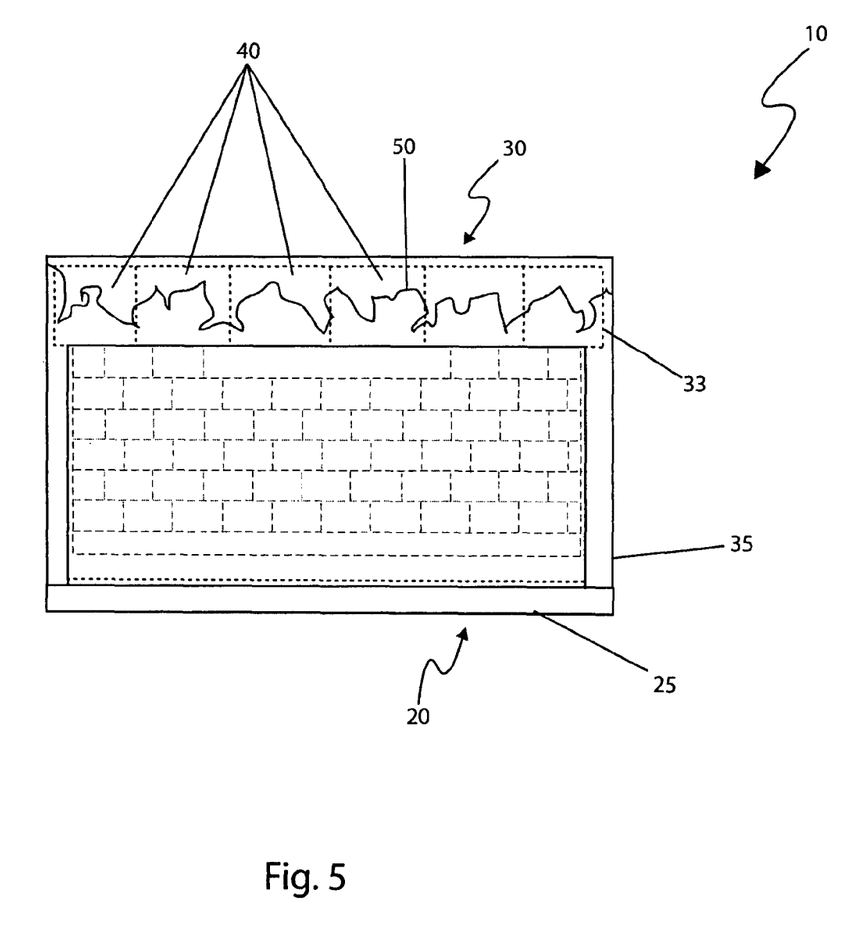
FIG. 5 is a top view of a portable computer cover 10, according to a preferred embodiment of the present invention; and, FIG. 6 is a bottom view of a portable computer cover 10, according to a preferred embodiment of the present invention.

Referring now to FIG. 5, a top view of the device 10, according to the preferred embodiment of the invention is disclosed. The keyboard cover 30 further comprises a plurality of removable sections 40 located on the third panel 33 of the keyboard cover 30 to facilitate access openings for items such as an integral track ball or mouse and the keys of the keyboard. The keyboard cover 30 does not extend over the keys of the portable computer.

Referring now to FIG. 6, a bottom side view of the device 10, according to the preferred embodiment of the present invention, is disclosed. The device 10 further comprises a keyboard cover portion 30 as described above with a second panel 32 possessing a plurality of removable sections 40. The second panel 32 completely covers the bottom surface of the portable computer 80 and provides the user with the ability to remove removable sections 40 as necessary so as to not inhibit the working of the cooling fan or prevent access to other portable computer peripherals or ports. The second panel 32 does not cover the hinge portion so that the portable computer 80 may be closed in a normal and expected manner.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of utilizing the device 10 may be achieved by performing the following steps: procuring a particular model of the device 10 which corresponds thereto a user's specific portable computer 80; installing the display screen cover 20 thereto the display screen portion of the portable computer 80 by gently flexing said display screen cover 20 and forcing the first edge region 25 over outer peripheral features of the display screen portion of the computer 80 until obtaining a secure and complete fit therearound said computer screen 80; removing a plurality of removable sections located thereon the keyboard cover portion 30 in a corresponding manner thereto existing interface features such as access panels, buttons, cooling vents, connection ports, disc drives, and the like; installing the keyboard cover portion 30 in like manner as the display screen cover 20 described above; checking for proper alignment of removed removable sections 40 therein the keyboard cover 30 with respect to exposed computer features 80; using one's portable computer 80 in an expected manner as needed; replacing or exchanging said covers 20, 30 with new covers 20, providing a variety of different decorative elements 50 such as colors, graphic styles, surface textures, logos, and the like, based upon a user's preference; decorating external surfaces of one's computer covers 20, 30 as desired using stickers, paints, or other user applied artistic and personalized items; and, enjoying a decorative appearance and personal expression afforded a user of the present invention 10.

Due to the flexible plastic properties of the covers 20, 30, installation of said covers 20, 30 thereonto a computer 80 may be accomplished quickly and without additional tools.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A computer cover comprising a two-piece device removably attachable thereto a portable computer, further comprising:
    a display screen cover forming a pocket structure therefor a display screen portion of said portable computer;
    a keyboard cover forming a pocket structure therefor a keyboard portion of said portable computer;
    a plurality of removable sections located thereon said keyboard cover; and,
    a plurality of decorative elements located thereon said display screen cover and said keyboard cover;
    wherein said display screen cover and said keyboard cover are manufactured of a resilient scratch-resistant plastic;
    wherein said plurality of removable sections provide access to permit operation of at least one (1) interface element; and,
    wherein said portable computer cover provides a means to personalize and protect a portable computer.

2. The computer cover of claim 1, wherein said display screen cover comprises a first panel located on an outer surface of said display screen cover and expanding outwardly to form a wrap-around first edge on outer three (3) edges and a hinge edge of said first panel;
    wherein said first edge does not interfere with a hinge thereof said portable computer.

3. The computer cover of claim 2, wherein said display screen cover does not impede a view thereof said display screen portion.

4. The computer cover of claim 2, wherein said keyboard cover further comprises a second panel located on an outer surface of said keyboard cover and expanding outwardly so as to form a wrap-around second edge on an outer perimeter of said second panel, and a third panel located on an inner portion of said keyboard cover;
    wherein said second edge does not interfere with said hinge thereof said portable computer.

5. The computer cover of claim 4, wherein said third panel does not impede an operation thereof said keyboard portion.

6. The computer cover of claim 1, wherein said display screen cover and said keyboard cover are transparent.

7. The computer cover of claim 6, wherein said computer cover is sized to fit various models of portable and laptop computers.

8. The computer cover of claim 7, wherein said cover further comprises an acrylonitrile butadiene styrene (ABS) or a polycarbonate construction.

9. The computer cover of claim 8, wherein said plurality of decorative elements comprise at least one (1) of the following in any combination: multiple colors, graphic styles, surface textures, graphic printing, flames, sports-themed logos, hero-themed logos, entertainment icons, and company logos.

10. A method of protecting a portable computer with a decorative protective cover comprising the following steps:
   providing said cover further comprising:
      a display screen cover forming a pocket structure therefor a display screen portion of said portable computer, further comprising:
         a first panel located on an outer surface of said display screen cover and expanding outwardly to form a wrap-around first edge on outer three (3) edges and a hinge edge of said first panel;
         wherein said first edge does not interfere with a hinge thereof said portable computer; and,
         wherein said display screen cover does not impede a view thereof said display screen portion;
      a keyboard cover forming a pocket structure therefor a keyboard portion of said portable computer, further comprising:
         a second panel located on an outer surface of said keyboard cover and expanding outwardly so as to form a wrap-around second edge on an outer perimeter of said second panel; and,
         a third panel located on an inner portion of said keyboard cover;
         wherein said second edge does not interfere with said hinge thereof said portable computer; and,
         wherein said third panel does not impede an operation thereof said keyboard portion;
      a plurality of removable sections located thereon said second edge, said second panel, and said third panel thereof said keyboard cover, wherein said plurality of removable sections comprise a perforated portion selectively removable by a user; and,
      a plurality of decorative elements located thereon said display screen cover and said keyboard cover portion;
      wherein said display screen cover and said keyboard cover portion are manufactured of a resilient scratch-resistant plastic;
      wherein said plurality of removable sections provide access to permit operation of at least one (1) interface element; and,
      wherein said portable computer cover provides a means to personalize and protect a portable computer;
   installing said display screen cover onto said display screen portion of said portable computer by gently flexing said display screen cover and forcing said first edge over an outer peripheral feature until obtaining a secure and complete fit around said display screen;
   installing said keyboard cover onto said keyboard portion of said portable computer by gently flexing said keyboard cover and forcing said second edge and said third panel over an outer peripheral features and obtaining a secure and complete fit around said keyboard portion;
   removing a removable section from said keyboard cover that corresponds with an interface element located on said personal computer to provide an access opening thereto;
   repeating the previous step as necessary to provide access to all desired interface elements located thereon said personal computer;
   verifying for a proper alignment thereof said access opening in said keyboard cover with respect to said all desired interface elements;
   using said portable computer in an expected manner as needed;
   replacing or exchanging said cover with a new cover comprising a variety of different decorative elements; and,
   enjoying the decorative appearance, personal expression and protection of said portable computer.

11. The method of claim 10 comprising the additional step of:
   providing said cover comprising a transparent material; and,
   decorating said computer cover with stickers, paints or other user-applied artistic and personalized items.

* * * * *